United States Patent [19]

Chen et al.

[11] Patent Number: 4,982,045
[45] Date of Patent: Jan. 1, 1991

[54] FIXED BED PROCESS FOR POLYMERIZING LIQUID BUTENES

[75] Inventors: Frank J. Chen, Piscataway; Robert D. Lundberg, Bridgewater, both of N.J.

[73] Assignee: Exxon Chemical Patents Inc., Linden, N.J.

[21] Appl. No.: 385,712

[22] Filed: Jul. 26, 1989

Related U.S. Application Data

[63] Continuation of Ser. No. 93,804, Sep. 4, 1987, abandoned, which is a continuation-in-part of Ser. No. 941,288, Dec. 12, 1986, abandoned.

[51] Int. Cl.$^5$ ............................................. C07C 2/08
[52] U.S. Cl. ..................................................... 585/532
[58] Field of Search ......................................... 585/532

[56] References Cited

U.S. PATENT DOCUMENTS

| | | | |
|---|---|---|---|
| 2,040,658 | 5/1936 | Kuentzel et al. | 196/10 |
| 2,329,714 | 9/1943 | Grasshof | 196/10 |
| 2,698,320 | 12/1954 | Garabrant et al. | 260/94.8 |
| 2,779,753 | 1/1957 | Garabrant et al. | 260/94.8 |
| 2,856,392 | 10/1958 | Tegge et al. | 585/532 |
| 2,856,393 | 10/1958 | Goering | 585/532 |
| 2,957,930 | 10/1960 | Jackson | 260/683.15 |
| 3,109,041 | 10/1963 | Child et al. | 260/683.15 |
| 3,119,884 | 1/1964 | Allen et al. | 260/683.15 |
| 3,200,169 | 8/1965 | Nichols | 260/683.15 |
| 3,200,170 | 8/1965 | Nichols | 260/683.15 |
| 3,497,568 | 2/1970 | Stepanek et al. | 260/683.15 |
| 3,558,737 | 1/1971 | Solmes | 260/683.15 |
| 3,985,822 | 10/1976 | Watson | 585/532 |
| 3,997,129 | 12/1976 | Ban et al. | 242/201 |
| 4,288,649 | 9/1981 | McCaulay | 585/533 |
| 4,400,493 | 8/1983 | Abernathy et al. | 585/532 |
| 4,463,212 | 7/1984 | Imai | 585/530 |

FOREIGN PATENT DOCUMENTS 1195760 6/1970 United Kingdom .
2001662 2/1979 United Kingdom .

OTHER PUBLICATIONS

Yu. A Sangalov et al., "Gustavson Polymer Complexes", 1983, 317–320, *Vysokomol. Soedin, Ser. B* 25, Inst. of Chem. of the Bashkirian Acad. of Sciences, Ufa, U.S.S.R.

*Primary Examiner*—Asok Pal
*Attorney, Agent, or Firm*—J. B. Murray, Jr.; M. B. Kapustij

[57] ABSTRACT

This process is one in which a butene feed is passed through a fixed bed of granular aluminum trichloride catalyst, preferably in the presence of an added cocatalyst, to produce a polymerized butene product having number-average molecular weight of greater than about 250.

30 Claims, No Drawings

FIXED BED PROCESS FOR POLYMERIZING LIQUID BUTENES

CROSS-REFERENCE TO RELATED APPLICATIONS

This application is a continuation of application Ser. No. 07/093,804, filed Sept. 4, 1987 which application is a continuation-in-part of Ser. No. 941,288, filed Dec. 12, 1986, now both abandoned.

FIELD OF THE INVENTION

This process is one in which various butene liquid feeds are passed through a fixed bed of granular aluminum trichloride catalyst, preferably in the presence of an added co-catalyst, to produce a polymerized butene product having number-average molecular weight $\overline{M}_n$) of greater than about 250.

BACKGROUND OF THE INVENTION

The polymerization of various butenes, whether mixtures containing 1-butene, 2-butene and isobutene or only one or two of these isomers, using aluminum halide catalysts is known. Aluminum trichloride polymerization catalysts, often in conjunction with co-catalysts (or promoters) such as hydrogen chloride, alcohols or water, have been used to produce polybutenes. These catalysts typically are introduced into the reactor feed at a temperature, pressure and in such a fashion (e.g., as a suspended particle) that the catalysts stay highly dispersed until the polymerization reaction is considered to be complete Quite obviously, the polymeric product is more viscous than is the monomer feed. Consequently, termination of the polymerization reaction at a desired conversion or product molecular weight and removal of the dispersed catalyst from the viscous polymeric solution can be difficult.

Patents which are representative of these processes include U.S. Pat. Nos. 2,698,320 and 2,779,753. These show the polymerization of isobutylene using solid particulate aluminum trichloride.

U.S. Pat. Nos. 2,856,392 and 2,856,393 discusses the problem of equipment plugging which occurs when using aluminum trichloride particles as an isobutylene polymerization catalyst. The patent suggests drying the monomer diluents prior to introducing the monomer into the reaction zone. The drying medium is desirably granular aluminum chloride, alumina and/or bauxite Other disclosures include U.S. Pat. No. 2,957,930, which shows the use of 10 to 20% AlCl3 catalyst in the production of polyisobutylene from a $C_1$–$C_5$ petroleum gas feedstock with 0 08 to 0.12 percent HCl, relative to AlCl3, used as a catalyst promoter. This reference notes that correspondingly small quantities of water vapor chloroform, which can react with AlCl3 to release HCl, may also be used. British Patent 1,195,760 (1970) discloses the production of olefin polymer by polymerization in the presence of the catalyst comprising a liquid complex of AlCl3, HCl and an alkyl benzene. Polymerization products of materials other than polyisobutylene and products having a narrow molecular weight distribution are disclosed in this reference.

U.S. Pat. No. 3,119,884 discloses a series of vertical column reactors useful for polymerizing isobutylene. It further discloses a catalyst system of AlCl3 and HCl (or a substance which generates HCl). The catalyst system is described as an acid promoted AlCl3 catalyst. In such a system, a reaction between HCl and AlCl3 occurs to form $H^+AlCl_4^-$. This species initiates polymerization. According to this patent, one method of introducing the catalysts and reactant to the reactor is to introduce the three materials, i.e., AlCl3, HCl and liquid feed, through the same duct. This should result in the exothermic polymerization reaction beginning in the duct line where the temperature is not controlled by the refrigeration system of the reactor. Any product formed under these conditions should have an undesirably low molecular weight and broad molecular weight distribution.

U.S. Pat. Nos. 3,200,169 and 3,200,170 deal with the separation methods practiced after polymerization of propylene or butylene feeds. The process utilizes an ammonia treatment process. HCl is disclosed as a catalyst promoter which may be added to the reaction zone along with an AlCl3 catalyst.

U.S. Pat. No. 3,985,822 relates to the production of poly-n-butenes by use of AlCl3 promoted with HCl, but the objective is to reduce the isobutylene content of the polymer product.

U.S. Pat. No. 3,997,129 discloses synthesis of polybutenes from a $C_1$–$C_5$ liquefied refinery stream in which the catalyst is a solid, particulate AlC13 promoted with HCl gas or its equivalent. This process employs a static mixer for mixing catalysts and feed prior to conducting polymerization.

Two other references suggest the reaction of gaseous olefin over solid aluminum/chlorine-containing catalysts. They are U.S. Pat. Nos. 2,040,658 and 2,329,714.

U.S. Pat. No. 2,329,714 relates to a process for forming lubricating oils by the polymerization of gaseous olefins (principally propylene, alpha-butylene and the amylenes) by introducing the gaseous olefin into a bed of solid catalyst (e.g., aluminum chloride) while a solvent (benzene) is led over the catalyst in a continuous stream. The patentee discloses that the solid catalyst may generally be employed in fairly large quantities to achieve usefully high throughputs and for this reason it is generally not advantageous to use it on carriers. The aluminum chloride loses its solid form as a result of the formation of syrupy addition products, which are likely complexes formed in the reactor between the catalyst, the benzene and HCl generated by trace water in the feed. Therefore, the patentee employs the aluminum chloride as a finely powdered solid distributed in layers of porous materials (e.g., diatomite or pumice) which are capable of retaining the syrupy substances.

U.K. Patent Application 2,001,662 relates to a method for producing polybutenes by passing the liquid monomer feed through a fixed bed of catalyst material comprising a Lewis Acid chloride (e.g., AlCl3) catalyst intercalated within graphite. The catalyst is prevented from being fluidized during passage of the feed therethrough by packing the catalyst between layers of packing material which fill the remaining portions of the reactor. The feed moisture level is reduced to less than 20 ppm water, and HCl is optionally added to the gas feed as a co-catalyst. The patentees indicate that it is generally accepted that fixed bed catalyst systems, in conjunction with butene feeds, will yield only dimers and trimers of the butene, and that the prior art had not developed any fixed bed method wherein polymerization of butenes could be achieved with a catalyst having an extended life span and which does not contaminate the final product.

U.S. Pat. No. 4,288,649 relates to the production of polyisobutylene wherein isobutylene is polymerized in a liquid phase using a halided alumina catalyst, which can be prepared by contacting an activated alumina at temperatures above about 100° C. with such Cl-containing compounds as CCl₄ and chloroform. The halided alumina catalyst can be employed in a tubular reactor.

U.S. Pat. No. 4,400,493 relates to the polymerization of isobutylene in which the exothermic heat of reaction is removed by vaporizing unreacted hydrocarbons to maintain a constant controlled reaction temperature and pressure. Finely divided particles of aluminum trichloride are illustrated in a catalyst slurry. The patentee also suggests that the polymerization process can also be employed in a fixed catalyst bed, although no detailed teachings are contained thereto. The patent indicates that recycle rate within the reactor of about 10 times the fresh feed rate is important to the illustrated process.

U.S. Pat. No. 4,463,212 relates to oligomerization of of olefins employing a catalyst comprising a metal halide intercalated in a carbon matrix at 50 to 350.C. The process is illustrated with, inter alia, a catalyst comprising aluminum chloride intercalated in graphite at 200° C. for the oligomerization of propylene; a mixture of propylene dimers were obtained.

U.S. Pat. No. 3,109,041 relates to the polymerization of isobutylene in a 2-stage process. In the first stage, a Friedel-Crafts catalyst (e.g., aluminum trichloride) which is soluble in either the diluent, reactants or reaction products, is employed. The patentee indicates that the reaction vessel can comprise a tank having mechanical mixing means or a tubular reactor. The effluent from the first reaction stage, including catalyst, is then passed through a fixed bed reactor to polymerize the balance of the unreacted isobutylene. The fixed bed reactor comprises a Friedel-Crafts halide on an adsorbent supporting material, which can comprise activated carbon, silica, alumina and mixtures thereof. The effluent from the second stage reaction is said to comprise essentially polyisobutylene, hydrocarbon solvent and minor amounts of catalyst entrained or dissolved in the reaction product. This second stage effluent is then passed over an adsorbent bed, comprised of activated carbon, silica, alumina or mixtures thereof. The patentee discloses that the second stage reactor having the supported catalyst becomes ineffective over extended use due to buildup of polymer and the formation of non-active catalyst complexes. At the same time, the absorbent in the absorber unit is said to absorb the entrained catalyst, which then builds up and converts the absorber unit into a unit exhibiting substantial catalytic activity for polymerizing isobutylene monomer. The process was illustrated by the patentee employing titanium tetrachloride and boron trifluoride to product polyisobutylenes having average molecular weight of 680 and 636, respectively. In each illustration, the second stage fixed bed catalyst comprised titanium tetrachloride or boron trifluoride on silica gel.

U.S. Pat. No. 3,558,737 relates to a process for polymerization of propylene and butenes by contacting the olefin with a catalyst composed of a gamma alumina and chlorine or bromine having a surface area of 75 to 150 square meters per gram and containing about 3 to 15 weight percent chlorine and bromine.

U.S. Pat. No. 3,497,568 relates to a process of polymerizing olefins of 3 to 5 carbon atoms wherein the liquefied mixture of an olefin feedstream is passed upwardly through a vertical elongated reaction vessel partially loaded with silica gel in the lower portion of the reactor while introducing a catalyst solution of aluminum bromide and hydrogen bromide into the reactor at a point adjacent to the upper level of the bed of silica gel. An effluent containing the polymerization reaction products is recovered from the top of the reactor. The catalyst for this reaction is aluminum bromide promoted with hydrogen bromide.

Y. A. Sangalov, et al., *Vvsokomol. Soedin. Ser. B 25 #5*, 317–320 (1983) prepared immobilized cationic catalysts for polymerization of isobutylene by reaction of Gustavson complexes of the general formula a ArHX-MeX$_n$ (Ar = aromatic hydrocarbon, HX Bronstedt acid, MeXn = Lewis Acid, a=3–6) with polystyrene or cross-linked divinylbenzene-styrene copolymer.

None of these references suggest the production of polybutenes using liquid butenes and a fixed bed of a granular aluminum chloride catalyst

SUMMARY OF THE INVENTION

This invention is a process for producing polybutenes from butenes in a tubular reactor using a fixed bed, granular, unsupported aluminum chloride catalyst. The catalyst is surprisingly more effective than the supported aluminum chloride catalysts of the prior art. The feedstock may be any of the C₄ olefins, pure or mixed, or may be diluted with an inert solvent such as butane or isobutane. The preferred feedstocks are mixtures of 1-butene, 2-butene, and isobutene. The resultant polymeric material may be characterized as having a number-average molecular weight ($\overline{M}_n$) of greater than about 250, preferably between about 400 and 3,000 and more preferably from about 900 to 2500. The molecular weight distribution of the product (the ratio of the weight-average to number-average molecular weight, $\overline{M}_w/\overline{M}_n$) is desirably from about 1.8 to about 3.0.

The process entails passing the butene feedstream through a fixed bed comprising aluminum chloride of a specific particle size, e.g., from about 0.8 mm to about 40 mm. The feedstream is preferably introduced to the catalyst bed at a temperature of between about −10° C. and 60° C.

The re a re three major variations to the invention. First, the process may be used at less severe conditions of temperature and space velocity upon feedstreams containing isobutylene as the major reactant. Second, the process may be used at more severe conditions upon feedstreams containing normal butenes as the main reactants, i.e., less than about 5% isobutene, to produce a poly-n-butene. Finally, the latter variation may be practiced on a mixed stream of n-butenes and isobutenes to produce a mixed polyisobutylene/n-butene polymer. The polymer may be separated (e.g., by distillation) and the resultant n-butene stream sent as a liquid stream to a second stage of catalyst to produce a poly-n-butene product. In this combination process, the first process step may be a conventional polymerization step.

The pressure is held at a level sufficient to maintain the feedstock in the liquid phase.

Co-catalysts (or promoters) such as anhydrous hydrogen chloride may also be added to the butene feedstream or the reaction vessel to enhance the reaction rate. Non-aromatic diluents may be employed in the liquid feedstream.

The product polybutenes, preferably polyisobutylene, may be used as the oil soluble hydrocarbon component of a lubricating oil dispersant based upon the reaction of polybutenyl succinic anhydride with compounds such as ethylene polyamines and polyols.

This process minimizes or avoids the use of the subsequent conventional treatment steps in which the product stream is quenched to stop the reaction, neutralized, washed, settled and dried to remove the contained catalytic material. This process obviously may be operated in the substantial absence of any neutralization, washing, settling and drying steps.

DESCRIPTION OF THE PREFERRED EMBODIMENTS

As noted above, this invention is a process for producing polybutenes from butenes by contacting a liquid feedstock butene in a tubular reactor with a fixed bed of a solid granular Lewis acid catalyst, preferably granular aluminum trichloride.

The tubular reactor is provided with an inlet and outlet, and is constructed of a suitable metal (e.g., Monel, and Hastelloy metal alloys which are resistant to corrosion in contact with chlorine-containing substances) to contain the reactants at the selected temperature and pressure conditions. The reactor can be cooled by immersing the reactor in a suitable coolant liquid (e.g., water or water/ethylene glycol mixtures) which is in turn cooled by conventional means. Also, if desired, a heat exchange device can be located within the tubular reactor to maintain the selected polymerization reaction temperature. The reactor can be segmented for ease of dismantling for loading of fresh catalyst and unloading of used or spent catalyst.

The tubular reactor can be provided with conventional catalyst screens or inert packing to maintain the catalyst bed within its fixed bed zone (or zones) within the reactor.

The reactor configuration may be one or more columns or tubes or other suitable form, and the fixed bed can comprise one or a series of beds. The multiple beds may be shallow (and adiabatic) and allow for cooling of each bed's effluent liquid by external heat exchange between the various beds. The fixed bed may be operated in up-flow, downflow, or horizontal flow as desired.

When a plurality of tubes are employed, they can be arranged in parallel in the form of a tube bundle suitably baffled for concurrent flow through each tube inlet and for concurrent withdrawal of product stream from each tube outlet, thereby permitting scale-up of the process to the desired mass throughput. The diameter of each tube should be generally in the range of from about 0.25 to about 5 cm, and more usually from about 0.6 to about 2.5 cm. Use of diameters smaller than 0.25 cm is possible, although with the attendant increased costs of construction of a commercially sized reactor. Use of tube diameters greater than 5 cm presents difficulties in heat removal from the tubes and the control of the reaction temperature.

The precise manner of construction of tubular reactors will be apparent to one of ordinary skill in the art and need not be further discussed here.

The feedstock to this process may be a pure or mixed butene stream containing one or more of 1-butene, 2-butene (cis and trans), and isobutene. It may be diluted by a miscible non-aromatic solvent (e.g., saturated aliphatic solvents) for the monomers, such as butane, isobutane or mixtures thereof. The preferred feedstocks (preferred on an availability and economic basis) are available from catalytic crackers and steam crackers. These processes are known in the art. The butene streams typically contain between about 6 wt. % and about 50 wt. % isobutylene together with 1-butene, cis-and trans-butene-2, isobutane and less than about 1 wt. % butadiene. One desirable $C_4$ feedstream is derived from refinery catalytic or steam cracking processes and contains about 6–45 wt. % isobutylene, about 25–35 wt. % saturated butanes and about 15–50 wt. % 1- and 2-butenes. The monomer feedstream is preferably substantially anhydrous, that is, it contains less than 50 ppm, and more preferably less than about 30 ppm, and most preferably less than about 10 ppm, by weight of water. Such low levels of water can be obtained by contacting the feedstream, prior to the reactor, with a water absorbent (such as $CaCl_2$, $CaSO_4$, molecular sieves and the like) or by the use of distillation drying. Suitable molecular sieves include 4 to 8 US mesh 3 Angstrom molecular sieves.

The monomer feed stream should also be subtantially free of any other impurity which is adversely reactive with the catalyst under the polymerization conditions. For example, the monomer feed to an aluminum chloride bed should be preferably subtantially free of bases (such as caustic), sulfur-containing compounds (such as $H_2S$, COS, and organo-mercaptans, e.g., methyl mercaptan, ethyl mercaptan), N-containing compounds, and the like. Most preferably, the monomer feed contains less than about 10 ppm by weight of sulfur-containing compounds, calculated as elemental sulfur, less than about 10 ppm by weight of N-containing compounds (calculated as elemental N), and less than about 10 ppm by weight of caustic, calculated as NaOH. Such low levels of base, sulfur and nitrogen impurities can be obtained by conventional techniques, as by the use of caustic to remove sulfur- and nitrogen- compounds from a refinery $C_4$ stream, followed by water washing to remove caustic, drying with any of the above water absorbents, hydrogenating to remove $C_3-C_5$ diolefins (e.g., butadienes) (to a level of below 1 wt. %, preferably <1,000 ppm by weight) and cooling the resulting purified $C_4$ stream for feed to the tubular reactors of the present invention, after admixing the selected cocatalyst therewith.

The monomer feedstream should also be substantially free of aromatic compounds, such as benzene, toluene, xylene, naphthalene and other aromatic solvents (e.g., <10 ppm aromatic compounds) to avoid the resultant reactive degradation of the aluminum chloride catalyst. Therefore, use of an aromatic solvent is not envisioned in this process.

The feedstream is maintained at a sufficient pressure (generally from about 100 to 2000 kPa, preferably from about 200 to 700 kPa) to be in liquid form both in the tubular reactor inlet and in the reaction mixture itself within the tubular reactor at the selected reaction temperature. The reactor inlet temperature will be a temperature within the range of from about $-10°$ C. to $+60°$ C., and the temperature within the reactor will be preferably controlled such that the reaction mixture within the reactor also falls substantially within that range. Conventional cooling means may be used to maintain the reaction at these temperatures in view of the exothermic nature of the reaction. Preferred reaction temperatures are from about $0°$ C. to $+20°$ C., with higher temperatures tending to produce relatively lower molecular weight polymers.

The selected pressure in the reactor can be maintained by applying an appropriate pressure on the feed in combination with a back pressure regulator on the outlet side of the reactor.

The exotherm is more pronounced in the tubular reactor near the inlet to the catalyst bed (e.g., within the first 4 to 30 pipe diameters in the catalyst bed). Over this distance, the reaction mass generally experiences a temperature rise (relative to the reactor inlet temperature) of from about 5 to 50 C, and more usually from about 15 to 40° C. Thereafter, the temperature of the reaction mass is decreased to the selected reactor outlet temperature, which is generally from about 2° C. below, to about 2° C. above, the reactor feed temperature. Most preferably, the outlet temperature from the reactor is substantially equal to the inlet or feed temperature to the reactor, since this implies substantially complete conversion of the monomer to product.

The butene feedstream is introduced into the reactor containing a fixed bed of a granular, unsupported Lewis acid catalyst. Although the catalyst may be any of the halides of aluminum, tin, zinc, antimony, titanium, or mixtures of any of these, the preferred material is aluminum trichloride. If desired, the catalyst can be admixed (viz, diluted) with inert (and preferably non-porous) materials (such as glass beads, glass helices, silicon dioxide (e.g., washed sand), Teflon beads and the like).

The preferred granular aluminum trichloride catalyst is commercially manufactured by conventional processes, as by the high temperature reaction of aluminum metal and chlorine gas. Preferably, the catalyst is substantially anhydrous, and has a surface area of from about 1 to 500 square centimeters per gram, more preferably from about 5 to 400 square centimeters per gram, still more preferably from about 10 to 200 square centimeters per gram, and most preferably from about 20 to 60 square centimeters per gram.

The catalyst is employed in its bulk, granular form, and is not 'supported', that is, the catalyst is not deposited as a thin layer on the surface of an inert catalyst support.

The catalyst itself may be any of the solid materials discussed above but preferably comprises aluminum trichloride. The catalyst may be of any suitable shape but is desirably spherical in shape to minimize the pressure drop across the reactor bed. The mean effective size of the catalyst particles should be at least about 0.8 mm, with the maximum size dependent on such factors as the size (viz, the diameter) of the reactor tube, the length of the tube, the degree of conversion to product desired, and other factors. Generally, however, the catalyst particles used in this invention will be from about 0.8 mm to about 30 mm, preferably from about 0.8 mm to about 20 mm, more preferably from about 0.8 mm to about 10 mm, and most preferably from about 0.8 mm to about 4 mm. The size is more desirably about 8 to about 20 mesh (that is, from about 841 microns to 2.38 mm).

As was noted above, this process may employ a feedstream containing either mainly isobutene as the reactant or n-butenes as the reactants. In the former case, at temperatures from about −10° C. and 20° C., isobutylene will be the major reactant (with the inclusion of some n-butene) even in view of the mixed butenes in the feed. If the stream comprises mainly mixed n-butenes (that is, with feeds containing <5 wt% isobutylene), then a higher temperature (generally 10–60 °C., e.g., 20° –50° C.) is desirable as is a higher concentration of co-catalyst.

Generally, the feedstream will be passed through the tubular reactor's catalyst bed at a liquid hourly space velocity, based on the total catalyst bed volume (that is, the volume of the catalyst bed zone(s) within the tubular reactor), of from about 1 to 100 $hr^{-1}$, and preferably from about 10 to 80 $hr^{-1}$.

It is contemplated that this process may be used to polymerize isobutenes from pure or mixed streams (containing other butenes); to polymerize n-butenes from streams containing small amounts of isobutenes (e.g., less than about 5 wt. %); or sequentially to polymerize isobutene from a mixed stream, to separate the polyisobutylene from the stream, to polymerize the n-butenes, and, if desired, separate the product polymer. Cocatalyst could be added between the isobutylene polymerization step and the n-butene polymerization step.

Other design parameters such as recycle rate and % diluents are matters of choice in this instance and may be readily determined by one having ordinary skill in chemical engineering.

A material acting as a co-catalyst (or promoter) may also be added to the butene feedstock before that feed is introduced to the tubular reactor or it may be added separately to the tubular rector, e.g., to the catalyst bed. Preferably gaseous, anhydrous HCl, is employed as the co-catalyst. The HCl will be employed in a catalytically effective amount, which amount will generally range from about 50 to 5000 ppm by wt. of the monomer feed, preferably 50 to 500 ppm (e.g., 70 to 200 ppm) by weight of the monomer feed when the monomer feed comprises >5 wt. % isobutylene, and preferably from about 100–5000 ppm (e.g., 400–3000 ppm) by weight when the feed comprises n-butenes and <5 wt. % isobutylene. If anhydrous HCl is added to the feedstream containing isobutene, t-butyl chloride is formed before contact with the solid catalyst. This has been found to promote the polymerization of the isobutene. Water, in a catalytic amount, may be added to the feedstock but is not preferred since it has a tendency to cause physical deterioration of the catalyst with time. Alcohols, such as the preferred lower alkanols (e.g., methanol), may also be added. As has been pointed out above, the monomer feed is preferably anhydrous, and the reaction mixture is also preferably substantially anhydrous (that is, contains <50 ppm, more preferably <30 ppm, and most preferably <10 ppm, by weight water based on the monomer feed).

The pressure drop across the tubular reactor will vary depending on the catalyst volume, catalyst particle size, flow rates, the tubular reactor's internal dimensions, and other factors, but will generally be less than about 500 kPa, e.g., from about 50 to 400 kPa, for inlet pressures of from 200 to 2000 kPa, respectively.

The reaction mixture is maintained substantially in the liquid phase within the tubular reactor, that is, the formation of a separate gaseous space in the reactor is preferably avoided or substantially minimized, although mixed vapor-liquid flow (resulting from the formation of minor amounts of bubbles in the reactor due to the reaction exotherm) can be employed.

The conversion, based on isobutene in the feedstock, may be as high as 99% if the teachings of the specification are followed.

The polymeric product, polybutene, produced by this process has a $\overline{M}_n$ than about 250, preferably between about 400 and about 3,000, and most preferably between about 900 and 2,500. The molecular weight distributions ($\overline{M}_W/\overline{M}_n$) are desirably about 2.0 (e.g., 1.9–2.3), although ratios can range between about 1.6 and about 3.0. The large difference in molecular weight between the feedstocks and the product polymer allows the use of simple distillation techniques to separate the product.

The liquid product effluent from the tubular reactor comprises polymer unreacted liquid feed materials (unreacted olefin, if any, and unreactables, such as saturates (viz, n- and iso- butane) and diluent, and is substantially free of catalyst particles, as may be visually observed on inspection of the effluent which is a clear polymer solution devoid of suspended catalyst particulates. The effluent preferably contains less than about 150 ppm, more preferably less than about 100 ppm, and most preferably less than about 50 ppm, by weight of the catalyst (e.g., $AlCl_3$) therein.

The liquid product mixture may be withdrawn from the tubular reactor and subsequently treated (e.g., by depressuring into a suitable gas/liquid separation drum or other vessel) for separation of gaseous components therefrom (e.g., unreacted isobutene, butene, butane, and isobutane). If desired, these separated gases can be compressed, cooled and recycled to the feed inlet to the tubular rector, although the need for such recycling is minimized or avoided by use of the process of this invention in view of the high olefin conversions which are obtainable. A portion of the liquid reactor effluent can be recycled to the feed to dilute the content of the monomers in the feed to the reactor, if necessary. Preferably, the monomers fed to the tubular reactor are substantially free of monomers recycled from the tubular reactor effluent. Therefore, the monomer feedstream is preferably contacted with the catalyst in the process of this invention on a once-through basis.

The polybutene polymers prepared by following the inventive process of this invention offers a number of advantages over those prepared by many other techniques with respect to the properties which are important in making lubricating dispersants, e.g., of the type formed by the reaction of polybutenyl succinic anhydride with polyamines or polyols.

One significant aspect of the process is that it permits reasonably precise control of product molecular weight and isobutene conversion. In lubricating oil dispersant technology it is known that the use of a higher molecular weight polybutene results in a dispersant additive exhibiting better engine performance in terms of sludge dispersancy and varnish deposit inhibition. However, some techniques for manufacturing polybutene have been somewhat unsatisfactory, since the viscosities of higher molecular weight materials increased proportionally to the molecular weight, thereby causing a number of problems in both handling and manufacture of the resulting dispersant products. The present process offers the advantage that, for a given molecular weight range, a material is formed at a relatively higher isobutene conversion than in conventional aluminum chloride catalyzed slurry polymerizations, and allows better control of polymer molecular weight than with such conventional slurry processes.

In the process of the present invention, the polymerization reaction is controllable and the target specification of molecular weight may be met via monitoring and adjustment of incoming co-catalyst addition rate, reactor temperature, feedstream temperature, residence time, feedstream introduction rate and the like. These parameters and the quality of the finished product can be monitored at close time intervals in the practice of the present invention. Thus, for a given polybutene molecular weight desired, process conditions can be defined which will direct the process toward the target product.

Another advantage of the invention is that a significant reduction in the quantity of so called 'light ends' in the polymer product can be realized by careful selection of reaction parameters within the disclosure herein. These are polybutenes in the undesirable $\overline{M}_n$ range of less than about 250. The process of this invention may minimize the quantity of these materials and the yield of desired product in the high molecular weight range increases accordingly. The tubular reactor effluent containing the products of this invention should contain the low molecular weight polybutenes in an amount of less than about 10 % by weight, based on the total polymer that is produced prior to product finishing.

Polybutenes prepared in accordance with this invention are particularly useful as a feedstock for the production of improved lubricating oil dispersants. These dispersants generally comprise the reaction product of polybutenyl succinic anhydride, or the acid form thereof, with monoamines or polyamines having up to about 30 carbon atoms, having at least one primary or secondary amino group such as the alkylene polyamines, particularly the ethylene polyamines, the polyoxyalkylene amines, aromatic and cycloaliphatic amines, hydroxyamines, mono-aliphatic and di-aliphatic substituted amines. Useful dispersants are also formed by reacting monohydric and polyhydric alcohols with the polyisobutenyl succinic anhydride or diacid provided in accordance with this invention and preferred materials are thus derived from polyols having 2 to 6 OH groups containing up to about 20 carbon atoms such as the alkene polyols and alkylene glycols. Also suitable are the polyoxyalkylene alcohols such as polyoxyethylene alcohols and polyoxypropylene alcohols, monohydric and polyhydric phenols and naphthols, ether alcohols and amino alcohols and the like. Borated derivatives of the foregoing dispersants are also useful, especially borated nitrogen containing dispersants resulting from boration with boron oxide, boron halide, boron acids and esters to provide 0.2 to 2.0 weight percent boron in the dispersant. Metals and metal-containing compounds can also form useful dispersants and these are compounds capable of forming salts with the polybutenyl succinic anhydride or acid (using the polybutenes of the present invention). These include metals such as the alkali metals, alkaline earth metals, zinc, cadmium, lead, cobalt, nickel, copper, molybdenum, in the form of oxides, carboxylates, halides, phosphates, sulfates, carbonates, hydroxides and the like.

Lubricating oil compositions will usually contain dispersants in amounts of from about 1 to 15 weight percent based on the overall weight of the composition. Lubricating oil compositions will typically contain other additives in customary amounts to provide their normal attendant functions such as metal detergents or basic metal detergents, anti-wear additives, anti-oxidants, viscosity modifiers and the like. Dispersants are conventionally packaged and dispensed in the form of solution concentrates containing about 20 to 50 weight percent dispersant in a mineral oil.

The invention is further illustrated by the following examples (wherein parts are by weight unless otherwise indicated) which are not to be considered as limiting its scope. In the Examples, the $C_4$ feeds were dry (<30 wt ppm water) and were free of catalyst poisons (<5 wt ppm S and <5 wt ppm N).

EXAMPLE 1

The polymerization reactor was a continuous copper tubing with 0.25 inch (6.4 mm) inside diameter packed with 24 g rams of granular $AlCl_3$ with particle size distribution of from about 841 microns to about 4.8 mm (−8 +20 mesh). A stainless steel screen was placed at the outlet of the reactor to keep the catalyst in place. The reactor was cooled by immersion in a bath of alcohol and water. The cooling bath was adjusted to maintain a temperature of 8.4° C. The temperature of the liquid mixed $C_4$ feed was maintained at 9.2° C. The flow rate of feed was maintained at about 80 ml/min.

Five thermocouples were installed along the tubular reactor to record the temperature profile of the reactor. Each thermocouple was separated from its neighbor by 10 inches (25.4 cm). The temperature readings of the five thermocouples, starting from the inlet of the tubular reactor, were 13.2° C., 10.6° C., 10.4° C., 10.9° C., and 10.6.C, respectively. The feedstock was 13.4% isobutene, 11.9% butene-1, 11.8% butene-2 and 62.8% isobutane. About 150 ppm by weight of water was added to the mixed $C_4$ feed as cocatalyst. The effluent from the reactor was monitored by an on-line gas chromatograph. The composition of the reactor effluent was as follows: isobutene 0.4%, butene-1 11.6%, butene-2 (which contains both cis and trans isomers) 13.8%, isobutane 74%. The resulting polymer was measured by GPC to have a number-average molecular weight of 1240.

The polymer was a clear viscous mass which was completely soluble in the reactor effluent diluent and emerged from the tube as a clean solution free of catalyst particle residue and in a free flowing condition.

EXAMPLE 2

A reactor similar to that in Example 1 was then constructed; it was, however, shorter, about 30 inches (76.2 cm) in total length. Three thermocouples were installed along the tube at 10 inch (25.4 cm) intervals. The liquid mixed $C_4$ feed composition was similar to Example 1 except 200 ppm of HCl by weight was added to the feed as cocatalyst instead of water. The temperature of cooling bath was maintained at 9.3° C. The feed temperature was 10.3° C. The feed flow rate was maintained at 128 ml/min. The temperature profile along the reactor was: 9° C., 9.5° C., 15° C. The composition of the reactor effluent was 0.2% isobutene, 9.2% butene-1, 10.2% butene-2, and 80.4% isobutane. The resulting polymer was determined to have $\overline{M}_n = 1074$. The butene-1 content of the resulting polymer, after removal of the light ends by distillation, was measured as 20.5 weight percent. The viscosity of the resulting polymer, at 100° C., was 193 cSt.

EXAMPLE 3

The polymer obtained in Example 2 was chlorinated using chlorine gas at 121° C. to obtain a chlorinated polybutene with a chlorine content of 3.96% by weight. The chlorinated polybutene was reacted with maleic anhydride at 1:1 mole ratio at 232.C for 4 hours. The saponification number of the resulting product was measured as 111.5 and percent active ingredient was 82.4%. The viscosity of the product, at 100° C., was 570 cSt.

EXAMPLE 4

A reactor similar to that of Example 1 (except of 20 inches in length and 0.375 inch (9.5 mm) inside diameter) was packed with 20 grams of granular AlC13 having a particle size distribution from −4 to +14 mesh (1.41 mm to 4.76 mm). The liquid mixed $C_4$ feed composition comprised 15% isobutene, 15% butene-1, and 55% isobutane. About 150 ppm of HCl by weight was added to the feed as cocatalyst in addition to about 50 ppm of water. The cooling bath was adjusted to maintain 19.3° C. The feed temperature was maintained at 21.2 C. The flow rate of feed was maintained at 106 ml/min. The temperature recorded by the two thermocouples placed along the reactor were 20.9° C. and 20.2° C. The $\overline{M}_n$ of the resulting polymer was measured by GPC as 849. The viscosity was 121 cSt at 100° C.

EXAMPLE 5

The polymer obtained in Example 4 was chlorinated using chlorine gas at 121° C. to obtain a chlorinated polybutene having 3.84% chlorine by weight. This material was reacted with maleic anhydride at a 1:1 mole ratio at 232° C. for 4 hours. The resulting product had a viscosity of 480 cSt, an active ingredient level of 81.3%, and a saponification number of 115.

EXAMPLE 6

The product sample of Example 5 was reacted with a polyamine in a S150N (solvent 150 neutral) oil at 149° C. to prepare a dispersant. It contained 1.5% nitrogen.

EXAMPLE 7

The product of Example 3 was reacted with a polyamine in S150N oil at 149° C. to prepare a dispersant. It contained 1.6% nitrogen.

EXAMPLE 8

A commercially available polyisobutylene succinic anhydride polyamine prepared from a 950 $\overline{M}_n$ PIB was measured for nitrogen content. (The PIB was itself made in a conventional stirred tank reactor with finely divided aluminum chloride powder as slurry catalyst (<100 mesh, <149 microns) and HCl as co-catalyst. The dispersant contained 1.58% nitrogen, had a saponification number of 112 and an active ingredient level of 80%.

Each of the dispersants of Example 6, 7, and 8 were subjected to two dispersancy bench tests, SIB (sludge inhibition test) and VIB (varnish inhibition test). The summary of the tests are shown in the Table I. For each of the tests, the smaller the number, the better the dispersancy. The table also contains a blank. The blank has no dispersant and is for comparison purposes.

TABLE I

| Ex. No. | $M_n$ | % Butene-1 | SAP | % Oil | SIB | VIB |
|---|---|---|---|---|---|---|
| 6 | 849 | 12 | 115 | 81 | 8.9 | 9 |
| 7 | 1074 | 26 | 112 | 82 | 9.5 | 6.5 |
| 8 | 950 | 10 | 112 | 80 | 10.1 | 7 |
| Blank* | — | — | — | — | 21.5 | 11 |

*(comparative)

It is clear that the materials of the invention are better in both SIB and VIB tests than the commercial material.

EXAMPLE 9

A series of additional runs are made employing the reactor described in Example in which the catalyst bed comprises the materials described in Table II below. The liquid feedstock comprises 15% isobutylene, 15% butene-1, 15% butene-2 and 55% isobutane. Water is added to the liquid feed as co-catalyst in the amounts indicated in Table III below. All runs employ substantially the volume of catalyst.

These results show the improved results achieved by use of the fixed bed granular aluminum chloride catalysts in accordance with the process of this invention, as compared to finely divided aluminum chloride catalyst and to various supported catalyst materials.

TABLE II

| Example No. | Catalyst |
| --- | --- |
| Comparative A | 35–40 wt % AlCl$_3$ intercalcated in graphite powder; 200 mesh (<74 microns). |
| Comparative B | 1 wt % AlCl$_3$ on cross-linked polystyrene (2% divinylbenzene) powder (Alfa Products, Morton Thiokol). |
| Comparative C | CoCl$_2$ on 4 Angstrom molecular sieve; 8 × 12 mesh (1.7 to 2.4 mm) Union Carbide Corp.. |
| Comparative D | CoCl$_2$ on silica gel; 8 × 12 mesh (1.7 to 2.4 mm) Union Carbide Corp. |
| Comparative E | CoCl$_2$ on activated alumina; 8 × 12 mesh (1.7 to 2.4 mm) Union Carbide Corp. |
| Comparative F | AlCl$_3$ solids; −20 + 40 mesh (0.42–0.841 mm). |
| Comparative G | HCl/AlCl$_3$/xylene complex (1:2:3 mole:mole:mole) saturated on Amberlyst 15 sulfonated macroreticular polystyrene DVB crosslinked resin (Alfa Products, Morton Thiokol). |
| Example 9 | AlCl$_3$; −4 + 20 mesh (0.841–4.76 mm). |

TABLE III

| Example No. | Reactor Temp. (°C.) Feed | Reactor Temp. (°C.) Outlet | Reactor Pressure Feed | Reactor Pressure Outlet | Water (wppm) | Liquid Flow (ml/min) | i-C$_4$= Conv. (%) |
| --- | --- | --- | --- | --- | --- | --- | --- |
| Comp. A | 1 | — | 600 | — | 150 | 0 | 0[2] |
| Comp. B | 1 | — | 600 | 200 | 100 | 50–100 | 0[3] |
| Comp. C | 1 | — | 600 | 200 | 100 | 50–100 | 0[3] |
| Comp. D | 1 | — | 600 | 200 | 150 | 50–100 | 0[3] |
| Comp. E | 1 | — | 600 | 200 | 150 | 50–100 | 0[3] |
| Comp. F | 1 | — | 600 | — | 150 | <10 | 0[4] |
| Comp. G | 1 | — | 600 | 200 | 150 | 50–100 | 0[3] |
| Ex. 9 | −15 | −10 | 600 | 200 | 150 | 50–100 | 100[5] |

NOTES:
[1] Reactor feed temperatures are varied over a range of from 0 to 50° C. in an attempt to increase the rate of polymerization.
[2] No feed flow is observed. Trace of oily liquid is found upon dissassembly of reactor, after washing of catalyst with isobutane.
[3] No monomer conversion is observed.
[4] Some oily polymer product is formed, but no noticeable GC monomer conversion is noted.
[5] <2 wt % isobutylene in reactor effluent which is observed to be clear polymer solution, free of particulates.

EXAMPLES 10–13

An additional series of runs are made employing the reactor procedure of Example 9, except that gaseous anhydrous HCl is employed as co-catalyst instead of water. The results thereby obtained are summarized in Table IV below.

These data indicate the control of monomer conversion which can be achieved in the practice of the process of said invention by variations in the HCl/AlCl$_3$ ratio.

TABLE IV

| Example No. | Reactor Temp. (°C.) Feed | Reactor Temp. (°C.) Outlet | Reactor Pressure Feed | Reactor Pressure Outlet | HCl (wppm) | Liquid Flow (ml/min) | i-C$_4$= Conv. (%) |
| --- | --- | --- | --- | --- | --- | --- | --- |
| Ex. 10* | 4 | 6 | 600 | 200 | 100 | 100 | 100[1] |
| Ex. 11 | 15 | 12 | 600 | 200 | 200 | 120 | 33 |
| Ex. 12 | 20 | 25 | 600 | 200 | 75 | 120 | 100[1] |
| Ex. 13 | 22 | 23 | 600 | 200 | 100 | 110 | 100[1] |

NOTES:
* = Feed 10% isobutylene, 15% butene-1, 15% butene-2 and 60% isobutane.
[1] <2 wt % isobutylene in reactor effluent which is observed to be clear polymer solution, free of particulates.

Having disclosed the invention by direct disclosure and by example, it should be apparent that there are equivalents to the process found in the following claims which fall within the spirit of the invention and which equivalents would be apparent to one having ordinary skill in this art.

What is claimed is:

1. A continuous process for producing polybutenes comprising:
   introducing liquid feedstream containing at least isobutene into a tubular reactor containing therein at least one fixed bed comprising granular, unsupported aluminum trichloride catalyst having a mean particle size of between about 0.8 mm and 40 mm at a reaction pressure and temperature of between about −10° C. and about 60° C. suitable for polymerizing isobutene into product polybutene having a number-average molecular weight of greater than about 250, and recovering the polybutene.

2. The process of claim 1 wherein the feedstream comprises a mixture of isobutene, 2-butene, and 1-butene.

3. The process of claim 2 wherein the feedstream additionally contains a non-aromatic diluent.

4. The process of claim 3 wherein the reaction temperature is between about 0° and 20° C.

5. The process of claim 4 wherein the granular catalyst has a size of between about 0.8 and 30 mm.

6. The process of claim 4 wherein the number-average molecular weight of the polymeric product is between about 400 and about 3000.

7. The process of claim 5 wherein the weight-average molecular weight/number-average molecular weight ratio of the polymeric product is from about 1.6–3.0.

8. The process of claim 6 wherein a cocatalyst of hydrogen chloride is additionally introduced into the fixed catalyst bed.

9. The process of claim 6 wherein a cocatalyst of water is additionally introduced into the fixed catalyst bed.

10. The process of claim 6 wherein a cocatalyst of alcohol is additionally introduced into a fixed catalyst bed.

11. A process for the production of polyisobutene comprising contacting feedstream containing isobutene, 1-butene, 2-butene, 2-butene, non-aromatic diluent, and co-catalyst of hydrogen chloride at a temperature between about −10° C. and about 60° C. with fixed bed of granular, unsupported aluminum trichloride catalyst having a mean particle size between about 0.8 and 20 mm for a time effective to produce polyisobutene, and recovering polyisobutene.

12. A continuous process for producing polybutenes comprising:

introducing a liquid feedstream containing normal butenes but no more than about 5% isobutene into a tubular reactor containing therein at least one fixed bed comprising a granular, unsupported aluminum trichloride catalyst at a reaction pressure and temperature suitable for polymerizing the n-butene into a product polybutene having a number-average molecular weight of greater than 250, and recovering the polybutene.

13. The process of claim 12 wherein the feedstream additionally contains a non-aromatic diluent.

14. The process of claim 12 wherein the reaction temperature is between about 10° and 60 ° C.

15. The process of claim 14 wherein the granular catalyst has a size of between about 0.8 and 40 nm.

16. The process of claim 15 wherein the granular catalyst has a size of between about 0.8 and 20 mm.

17. The process of claim 15 wherein the granular number-average molecular weight of the polymeric product is between about 400 and about 3000.

18. The process of claim 12 wherein a cocatalyst of hydrogen chloride is additionally introduced into the fixed catalyst bed.

19. The process of claim 12 wherein a cocatalyst of water is additionally introduced into the fixed catalyst bed.

20. The process of claim 12 wherein a cocatalyst of alcohol is additionally introduced into the fixed catalyst bed.

21. A continuous process for producing polybutenes comprising:

(a) introducing a first liquid feedstream containing isobutene and n-butenes into a first tubular reactor containing therein at least one fixed bed comprising a first granular, unsupported Lewis acid catalyst at a reaction pressure and temperature suitable for polymerizing the isobutene into a product polybutene having a number-average molecular weight of greater than 250;

(b) separating the polybutene product to form a stream containing n-butene and no more than about 5% isobutene;

(c) introducing the separated stream as a second liquid feedstream into a second tubular reactor containing at least one fixed bed containing a second unsupported granular Lewis acid catalyst at a reaction pressure and temperature suitable for polymerizing the n-butenes into a product poly-n-butene; and (d) recovering the product poly-n-butene.

22. The process of claim 21 wherein each said Lewis acid comprises aluminum trichloride.

23. The process of claim 2, wherein the feedstream comprises a mixture of isobutene, 2-butene, and 1butene.

24. The process of claim 23 wherein the feedstream additionally contains a non-aromatic diluent.

25. The process of claim 24 wherein both reaction temperatures are between 31 10° and 60° C.

26. The process of claim 25 wherein the step (a) reaction temperature is between 0° and 20° C., and the step (b) reaction temperature is between 10° and 60° C.

27. The process of claim 26 wherein the granular catalyst has a size of between about 0.8 and about 40 mm.

28. The process of claim 27 wherein the granular catalyst has a size of between about 0.8 and 20 mm.

29. The process of claim 24 wherein a co-catalyst is introduced into each said tubular reactor, said co-catalyst being selected from the group consisting of HCl, water, alcohols or mixtures thereof.

30. The process of claim 29 wherein the co-catalyst comprises anhydrous HCl in an amount of from about 50 to 5000 ppm of each said liquid feedstream.

* * * * *